(12) United States Patent
Kennedy et al.

(10) Patent No.: US 8,580,900 B2
(45) Date of Patent: Nov. 12, 2013

(54) THERMOPLASTIC AMPHIPHILIC CO-NETWORKS

(75) Inventors: Joseph P. Kennedy, Akron, OH (US); Gabor Erdodi, Stow, OH (US); Jungmee Kang, Stow, OH (US)

(73) Assignee: The University of Akron, Akron, OH (US)

( * ) Notice: Subject to any disclaimer, the term of this patent is extended or adjusted under 35 U.S.C. 154(b) by 472 days.

(21) Appl. No.: 12/740,829

(22) PCT Filed: Nov. 3, 2008

(86) PCT No.: PCT/US2008/012436
§ 371 (c)(1),
(2), (4) Date: Jun. 29, 2010

(87) PCT Pub. No.: WO2009/058397
PCT Pub. Date: May 7, 2009

(65) Prior Publication Data
US 2010/0267897 A1    Oct. 21, 2010

Related U.S. Application Data

(60) Provisional application No. 61/001,434, filed on Nov. 1, 2007, provisional application No. 61/107,949, filed on Oct. 23, 2008.

(51) Int. Cl.
*C08F 283/04*    (2006.01)
(52) U.S. Cl.
USPC .......... 525/453; 525/452; 525/455; 525/464; 528/28; 528/29; 528/85
(58) Field of Classification Search
USPC ......... 528/28, 29, 85; 525/452, 453, 455, 464
See application file for complete search history.

(56) References Cited

U.S. PATENT DOCUMENTS 5,100,992 A * 3/1992 Cohn et al. .................. 528/26
5,969,076 A * 10/1999 Lai et al. .................... 528/28
(Continued)

FOREIGN PATENT DOCUMENTS

| WO | WO-0059970 | * 10/2000 | ............ C08F 290/02 |
|----|------------|-----------|--------------------------|
| WO | WO2005/069966 | 8/2005 | |
| WO | WO2006/073499 | 7/2006 | |

OTHER PUBLICATIONS

Zheng, (John) Fang, et al., "Novel Block Inomers: III, Mechanical and Rheological Properties", J. Appl. Polym. Sci., 88(6), pp. 1516-1525, (2003).

(Continued)

*Primary Examiner* — Michael L Leonard
(74) *Attorney, Agent, or Firm* — REnner Kenner Greive Bobak Taylor & Weber

(57) ABSTRACT

The present invention relates generally to thermoplastic amphiphilic networks and/or co-networks. In one embodiment, the present invention relates to thermoplastic (TP) amphiphilic co-networks (APCNs) and the preparation of membranes from such APCNs. In another embodiment, the present invention relates to an amphiphilic network comprising at least one hydrophilic polymer-derived portion, at least one hydrophobic polymer-derived portion and at least one thermoplastic polymer-derived portion. In still another embodiment, the present invention relates to thermoplastic amphiphilic co-networks prepared by combining the chemistries of APCNs and polyurethanes (PUs) and to the preparation of membranes therefrom.

12 Claims, 14 Drawing Sheets

(56) References Cited

U.S. PATENT DOCUMENTS

| | | | |
|---|---|---|---|
| 6,306,177 | B1 | 10/2001 | Felt et al. |
| 6,528,584 | B2 | 3/2003 | Kennedy et al. |
| 6,555,619 | B1 | 4/2003 | Kennedy et al. |
| 6,727,322 | B2 | 4/2004 | Kennedy et al. |
| 6,831,133 | B2 | 12/2004 | Kennedy et al. |
| 6,852,804 | B2 | 2/2005 | Kennedy et al. |
| 6,930,151 | B2 | 8/2005 | Kennedy et al. |
| 7,071,277 | B2 | 7/2006 | Kennedy et al. |
| 7,105,622 | B2 | 9/2006 | Kennedy et al. |
| 7,196,142 | B2 | 3/2007 | Kennedy et al. |
| 7,211,108 | B2 * | 5/2007 | Furst et al. .................. 623/1.44 |

OTHER PUBLICATIONS

Ralf M> Peetz, et al., "Cationic Polymerization of Norbornadiene", J. polym. Scie., Part A, Polym. Chem., 41(6), pp. 732-739, (2003).

Ralf M. Peetz, et al., "Synthesis and Characterization of Two Novel Star-Blocks: tCum[poly(isobutylene-b-norbornadiene)]. . . ", J. Polym. Scie., Part A., Polym. Chem. 41(6), pp. 740-751, (2003).

I.S. Isayeva, et al., "Characterization and Biological Performance of Membranes Designed for Macroencapsulation/Implantation of Cells", (Paper XX of the series Amphiphilic Networks), Biomaterials, 24(20), pp. 3483-3491, (2003).

P. Kurian, et al., "Synthesis, Permeability and Biocompatibility of Tricomponent Membranes Containing Polyethylene Glycol, Polydimethylsiloxane and . . . ", (Part XXI of the series Amphiphilic Networks), Biomaterials, 24(20), pp. 3493-3503, (2003).

Irada S. Isayeva and J.P. Kennedy, "Amphiphilic Membranes Crosslinked and Reinforced by POSS", J. Polym. Scie., Part A., Polym. Chem., 42(17), pp. 4337-4352 (2004).

Joseph P. Kennedy, "Designed "Smart" Amphiphilic Membranes for Immunoisolation", on DC of Congress Proceedings, World polymer Congress—Macro 2004, Symposium 5.3: Biorelated Polymers.

Nihan Nugay, et al., "Cyclosiloxane-based Networks: Synthesis, Thermal Characterization and Microstructure", J. Polym. Scie., Part A., Polym. Chem., 43, pp. 630-637, (2005).

Kathleen M. Wollyoung, et al., "Synthesis and Mass Spectrometric Characterization of Centrally and Terminally Amine-Functionalized Polyisobutylenes", J. Polym. Scie., Part A, Polym. Chem. 43(5), pp. 946-958, (2005).

J.P. Kennedy and J.E. Puskas, "Thermoplastic Elastomers by Cationic polymerization", Chapter 12; pp. 285-322 in Thermoplastic Elastomers G. Holden, H.R. Kircheldorf and R. Quirk eds., Hanser Pub., 34d edition, (2004).

Andras Nagy, et al., "Surfaces Treated with Hydrophobizing Microemulsions", Extent of Coverage by Mass Spectrometry and Contact Angles; Applied Surface Science, 5, 63 (2005).

J.P. Kennedy, et al., "Two Generations of Synthetic Membranes for Biological/Medical Applications", Designed Monomers and Polymers, 7(6), 485-494 (2004).

G. Erdodi and J.P. Kennedy, "Ideal Tetrafunctional Amphiphilic PEG/PDMS Co-networks by a Dual-Purpose Extender/Crosslinker, I Synthesis", Part XXIV of the series Amphiphilic Co-networks, J. Polym. Sci., Part A., Polym. Chem. 43, pp. 4953-4964 (2005).

G. Erdodi and J.P. Kennedy, "Ideal Tetrafunctional Amphiphilic PEG/PDMS Co-networks by a Dual-Purpose Extender/Crosslinker, II", Characterization and Properties of Water-Swollen Membranes; Part XXV of the series Amphiphilic Co-networks, J. Polym. Sci., Part A, Polm. Chem., 43, pp. 4965-4971, (2005).

J.P. Kennedy, Highlight From Thermoplastic Elastomers to Designed Biomaterials, J. Polym. Sci: Part A: Polym. Chem., 43, pp. 2951-2963, (2005).

G. Erdodi and J. Kennedy, "Water-Swollen Highly Oxygen Permeable Membranes; Analytical Technique and Syntheses", J. Polym. Sci., Part A., 43, pp. 3491-3501, (2005).

Gabor Erdodi and J.P. Kennedy, "Amphiphilic Co-networks: Definition, Synthesis, Applications", Progress in Polymer Science, 31, pp. 1-18, (2006).

Chunju He, et al., "Individual and Simultaneous Swelling of Amphiphilic Co-networks in Water and n-Heptane", Part XXVI of Amphiphilic Co-networks, J. Polym. Sci., Part B: Polym. Phys. 44(10), pp. 1474-1481, (2006).

Jeremy Daum, et al., "Cyclolinear Polysiloxanes: I, Synthesis and Characterization", J. Polym. Sci., Part A., Polym. Chem. 44(13), pp. 4039-4052, (2006).

Jeremy Daum, et al., "Cyclolinear Polysiloxanes: II, Crosslinking and Characterization", J. Polym. Sci., Part A., Polym. Chem. 44(13), pp. 4053-4062 (2006).

J.E. Puskas, et al., "Natural Rubber Biosynthesis: A Living Carbocationic Polymerization", Prog. Polym. Sci., 31, pp. 533-548, (2006).

G. Erdodi and J. P. Kennedy, "3rd Generation Amphiphilic Co-Networks, I.," Synthesis and Swelling Behavior of Poly(N, N-dimethyl Acrylamide)/Polydimethysiloxane Co-networks; part XXVII of the series Amphiphilic Co-networks, J. Polym. Sci., Part A., Polym. Chem. 45, pp. 295-307, (2007).

Karunakaran and J.P. Kennedy, "Synthesis, Characterization, and Properties of Novel Highly Oxygen Permeable Amphiphilic Membranes; Part XXVIII of the series Amphiphilic Co-networks", J. Polym. Sci., part A, Polym. Chem. 45, pp. 308-316 (2007).

Suresh Jewrajka, et al., "Novel Biostable and Biocompatible Amphiphlic Membranes; Part XXIX of the series Amphiphilic Co-networks", J. Biomed. Mat. Res., pp. 69-77, in press.

Jungmee Kang, et al., "Third Generation Amphiphilic Co-networks II: Permeabilities and Mechanical Properties; Part XXX of the series Amphiphilic Co-networks", J. Polym. Sci., Part A, Polym. Chem. 45, pp. 4276-4283, (2007).

* cited by examiner

THERMOPLASTIC AMPHIPHILIC CO-NETWORKS

RELATED APPLICATION DATA

This patent application claims priority to U.S. Provisional Patent Application No. 61/001,434, filed Nov. 1, 2007 and entitled "Thermoplastic Amphiphilic Co-Networks" and to U.S. Provisional Patent Application No. 61/107,949, filed Oct. 23, 2008 and entitled "Thermoplastic Amphiphilic Co-Networks." Both of the aforementioned United States Provisional patent applications are hereby incorporated by reference herein in their entireties.

FIELD OF THE INVENTION

The present invention relates generally to thermoplastic amphiphilic networks and/or co-networks. In one embodiment, the present invention relates to thermoplastic (TP) amphiphilic co-networks (APCNs) and the preparation of membranes from such APCNs. In another embodiment, the present invention relates to an amphiphilic network comprising at least one hydrophilic polymer-derived portion, at least one hydrophobic polymer-derived portion and at least one thermoplastic polymer-derived portion. In still another embodiment, the present invention relates to thermoplastic amphiphilic co-networks prepared by combining the chemistries of APCNs and polyurethanes (PUs) and to the preparation of membranes therefrom.

BACKGROUND OF THE INVENTION

Generally, amphiphilic co-networks comprise hydrophilic and hydrophobic polymers that can swell in both polar and non-polar solvents. Additionally, amphiphilic networks and/or co-networks can be used to produce polymer films that swell in both polar and non-polar solvents. Accordingly, films made from amphiphilic polymer networks and/or co-networks have been found to be desirable in the production of various articles including, but not limited to, contact lenses.

In one instance, amphiphilic co-networks (APCNs) are two-component networks of covalently interconnected hydrophilic/hydrophobic phases of co-continuous morphology; as such they swell both in water and hydrocarbons and respond to changes in the medium by morphological isomerization ("smart networks"). APCNs were conceived and first produced in Akron in 1988 and since that time have been intensely investigated by academic and industrial researchers around the world FIG. 1 helps to visualize the morphology of an APCN and its response to changing the solvent milieu.

First generation APCNs were prepared by the free radical copolymerization of select hydrophilic monomers (e.g., dimethyl acrylamide (DMAAm)) with methacrylate-capped polyisobutylene (MA-PIB-MA) as the crosslinker; thus these early APCNs comprised various hydrophilic main chains crosslinked by the hydrophobic PIB chains. Hydrophilic/hydrophobic domain co-continuity (percolation) was demonstrated by swelling experiments using water and hexane. The APCNs were found to be biocompatible in rats. Devices using such APCNs that contain porcine pancreatic islets enveloped/immunoisolated therein, when implanted into diabetic rats, were found to reduce their hyperglycemia.

Second generation APCNs were prepared by combining a suitable polyethylene glycol) (PEG) with suitable polydimethylsiloxane (PDMS) sequences. The motivation to develop second generation APCNs was to create membranes that allow the simultaneous rapid countercurrent transport of water (or aqueous solutions) and oxygen, a highly hydrophobic entity. Water diffuses via the hydrophilic channels provided by the hydrophilic PEG domains while $O_2$ permeates via the oxyphilic PDMS domains. The synthesis was simplified and then membranes with controlled amounts and molecular weights of hydrophilic/hydrophobic sequences were prepared. As expected, these APCNs were biocompatible; however, later we found that the PEG segments oxidatively degraded under simulated extended (e.g., weeks, months) implant conditions.

To overcome this degradation issue relating to PEG-containing APCNs for biological applications, third generation APCNs were developed in which the PEG segments were replaced by the oxidatively/hydrolytically/biologically resistant hydrophilic segment PDMAAm. The synthesis required the preparation of a novel crosslinking agent and a fundamentally new synthetic strategy. These APCNs were found to be eminently suitable for immunoisolation of pancreatic tissue, and became the subject of several patent applications.

On the other hand, the amphiphilic co-networks of the present invention are designed to create more versatile physically crosslinked processable recyclable APCNs. In one instance, there is a need in the art for reliable synthesis routes for thermoplastic amphiphilic co-networks (TP-APCNs) that can be processed thermally (by molding, injecting, extruding, etc.) or by solution techniques (casting, dipping, drawing, etc.).

SUMMARY OF THE INVENTION

The present invention relates generally to thermoplastic amphiphilic networks and/or co-networks. In one embodiment, the present invention relates to thermoplastic (TP) amphiphilic co-networks (APCNs) and the preparation of membranes from such APCNs. In another embodiment, the present invention relates to an amphiphilic network comprising at least one hydrophilic polymer-derived portion, at least one hydrophobic polymer-derived portion and at least one thermoplastic polymer-derived portion. In still another embodiment, the present invention relates to thermoplastic amphiphilic co-networks prepared by combining the chemistries of APCNs and polyurethanes (PUs) and to the preparation of membranes therefrom.

In one embodiment, the present invention relates to an amphiphilic network comprising at least one hydrophilic polymer-derived portion, at least one hydrophobic polymer-derived portion and at least one thermoplastic polymer-derived portion.

In another embodiment, the present invention relates to a method for producing a thermoplastic amphiphilic network comprising the steps of: (A) combining at least one isocyanate, at least one hydroxyl-terminated hydrophobic polymer, at least one polyol and at least one marcodiol; and (B) reacting the at least one isocyanate, the at least one hydroxyl-terminated hydrophobic polymer, the at least one diol and the at least one marcodiol to form a thermoplastic amphiphilic network.

In still another embodiment, the present invention relates to a method for producing a thermoplastic amphiphilic network comprising the steps of: (a) combining at least one amphiphilic graft copolymer having one or more hydrophilic portions and one or more hydrophobic portions with at least one copolymer having one or more hydrophobic portions and one or more thermoplastic portions; and (b) reacting the at least one amphiphilic graft copolymer having one or more hydrophilic portions and one or more hydrophobic portions with at least one copolymer having one or more hydrophobic portions and one or more thermoplastic portions to form a thermoplastic amphiphilic network.

DETAILED DESCRIPTION OF THE INVENTION

Figure 1:
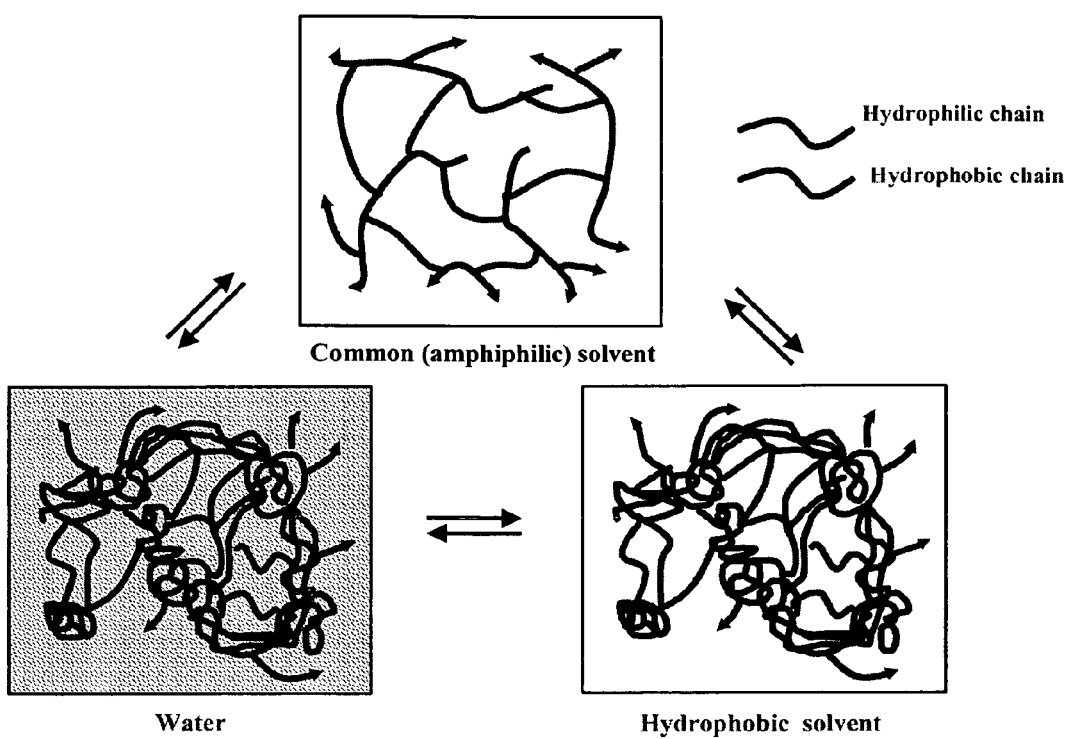
FIG. 1 illustrates the response of an APCN to hydrophilic and hydrophobic solvents.

The present invention relates generally to thermoplastic amphiphilic networks and/or co-networks. In one embodiment, the present invention relates to thermoplastic (TP) amphiphilic co-networks (APCNs) and the preparation of membranes from such APCNs. In another embodiment, the present invention relates to an amphiphilic network comprising at least one hydrophilic polymer-derived portion, at least one hydrophobic polymer-derived portion and at least one thermoplastic polymer-derived portion. In still another embodiment, the present invention relates to thermoplastic amphiphilic co-networks prepared by combining the chemistries of APCNs and polyurethanes (PUs) and to the preparation of membranes therefrom.

In one embodiment, TP-APCNs of the present invention can be created by combining the technologies of APCNs and PUs. Given this, the TP-APCN materials of the present invention will exhibit a unique combination of physical-chemical-transport-biological properties of both APCNs and the ease of processability of PUs. In another embodiment, the thermoplastic PU portion of the TP-APCNs of the present invention can be replaced by any suitable thermoplastic polymer so long as such polymers are biocompatible. Other suitable biocompatible thermoplastic polymers are known in the art including, but not limited to, polyureas, polystyrenes, suitable copolymers of the aforementioned polymer compositions, or suitable combinations of any two or more thereof.

In another embodiment, the TP-APCNs of the present invention comprise at least one hydrophilic polymer-derived portion (or segment), at least one hydrophobic polymer-derived portion (or segment) and at least one thermoplastic polymer-derived portion (or segment), where the TP-APCNs are physically crosslinked.

Suitable polymer compositions for use as the hydrophilic portion, or segment, of the present invention include, but are not limited to, one or more polyacrylamides, one or more polyhydroxy methacrylates (e.g., poly(hydroxy ethyl methacrylate)), one or more poly(alkyl)acrylic acids (e.g., polyacrylic acid or polymethacrylic acid), one or more polyalkylene glycols (e.g., a polyethylene glycol), one or more poly(4-vinylpyridines), one or more polyvinyl pyrrolidones, one or more polyvinyl alcohols, suitable copolymers of the aforementioned polymer compositions, or suitable combinations of any two or more thereof.

Suitable polymer compositions for use as the hydrophobic portion, or segment, of the present invention include, but are not limited to, one or more polysiloxanes (e.g., polydialkylsiloxanes), one or more polypropylenes, one or more polyisobutylenes, suitable copolymers of the aforementioned polymer compositions, or suitable combinations of any two or more thereof.

While not wishing to be bound to any one theory, it is believed that conventional linear amphiphilic PUs (i.e., PUs containing a hydrophilic segment such as PEG) are fundamentally unsuitable for TP-APCNs, mainly because of the trade off between transport and mechanical properties. High water uptake (a hydrogel) is mandatory for the transport of hydrophilic entities, however, stretched swollen hydrophilic segments are weak and prone to cleavage, which results in reduction of molecular weights and, consequently, of mechanical properties.

To overcome this fundamental shortcoming of linear PUs the present invention, in one embodiment, attaches hydrophilic branches to hydrophobic PU backbones and thus enables one to achieve independent control of various properties of the TP-APCNs (e.g., control transport properties and mechanical properties) of the present invention. The hydrophilic branches can rapidly aggregate into hydrophilic domains that ensure the permeation of hydrophilic molecules, while the self-associating hard segments in the hydrophobic main chain physically crosslink the entire construct.

Figure 2:
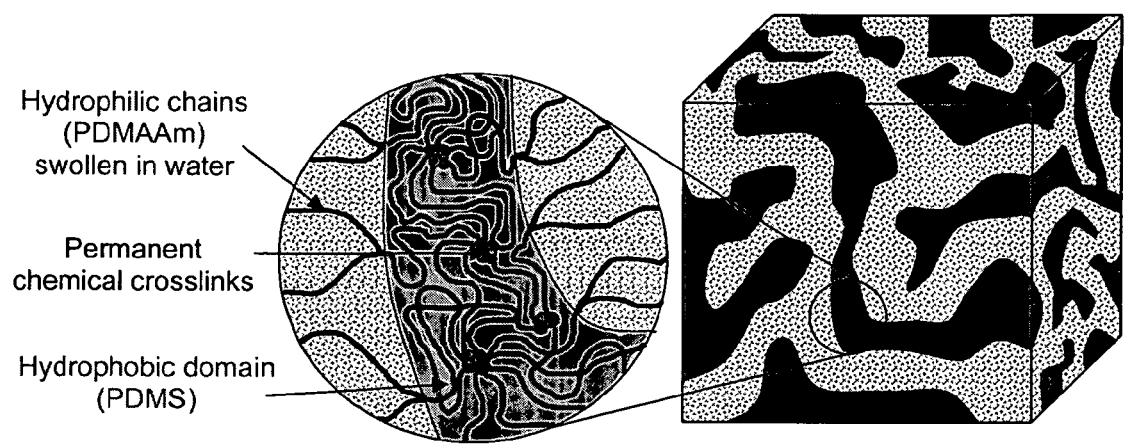
FIG. 2 illustrates the morphology of earlier chemically-crosslinked (unprocessable) APCNs.
Figure 3:
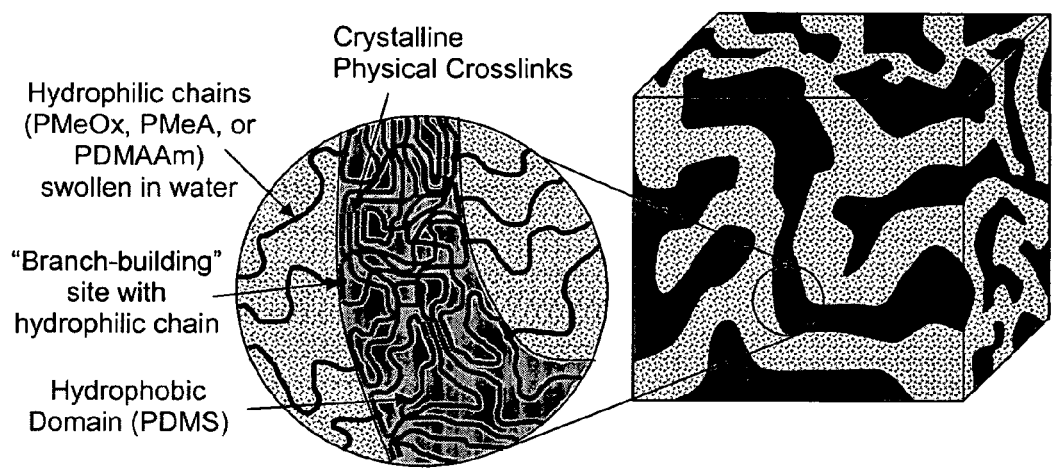
FIG. 3 illustrates one possible morphology of physically-crosslinked processable TP-APCNs in accordance with the present invention.

The Morphology:

In order to prepare a TP-APCN, first its morphology needs to be designed. FIG. 2 is an illustration of the morphology of third generation APCNs emphasizing the co-continuous chemically-crosslinked hydrophilic and hydrophobic domains that yield the combination of properties required of an immunoisolatory membrane, or extended wear soft contact lenses. The hydrophobic/oxyphilic PDMS domains provide O$_2$ transport, whereas the hydrophilic domains ensure the permeation of aqueous solutions (water, glucose, insulin, metabolic wastes). The rate and dimensions of hydrophilic molecules permeating through APCN membranes are controlled by the molecular weight of the hydrophilic segments. In the present invention, the TP-APCNs disclosed herein are designed to have a similar morphology to earlier APCNs except the chemically crosslinked domains are replaced by physically crosslinked domains that, in one embodiment, are provided by the self-assembled hard methylene diisocyanate-1,4-butanediol (MDI-BD) units of PUs. In this case, the above TP-APCNs are attained by creating amphiphilic PU grafts consisting of hydrophobic backbones carrying multiple hydrophilic branches. In the presence of sufficient amounts/molecular weights of hydrophilic branches continuous (percolating) hydrophilic domains arise, however, the self-associating hard MDI-BD units, which typically yield the crystalline crosslinking sites, are still able to form. The self-association of the hard units produces the final material. As is illustrated in FIG. 3, the sought morphology of the present invention contains soft PDMS domains with embedded hard MDI-BD (i.e., polyurethane (PU)) units that provide crystalline physical crosslinks.

Figure 4:
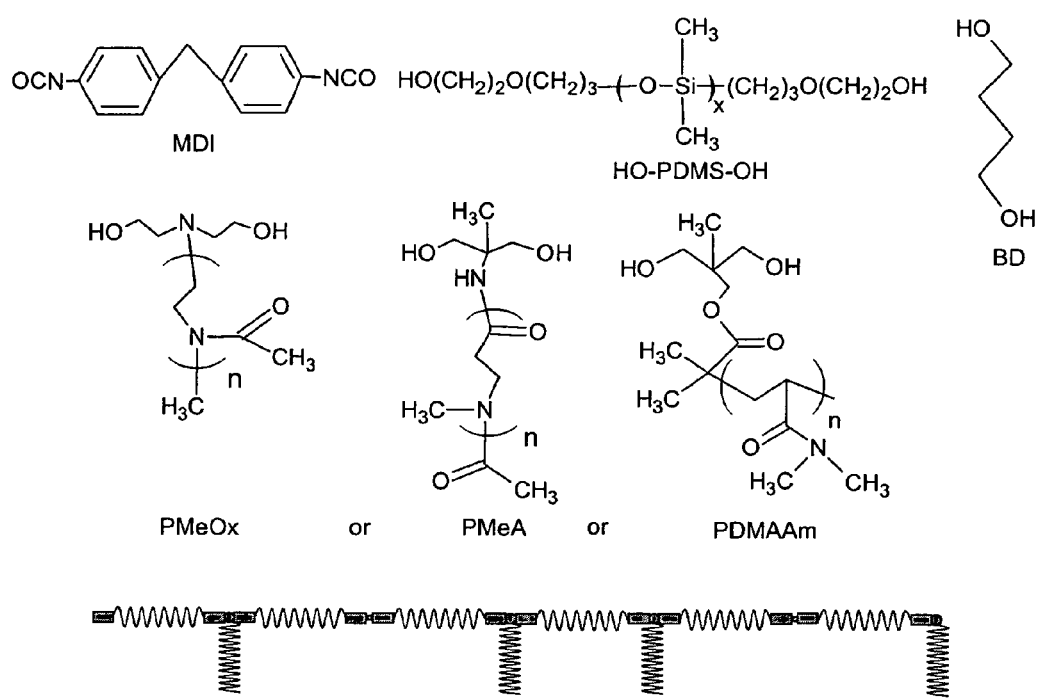
FIG. 4 illustrates one possible reaction route for producing a TP-APCN in accordance with the present invention where an amphiphilic PU graft comprising a hydrophobic backbone fitted with hydrophilic branches.

The Molecular Architecture:

In one embodiment, the sought morphology is achieved by the manner which the hydrophilic segments are attached to a PU backbone of soft PDMS plus hard MDI-BD segments. To this end, the present invention enables one to synthesize hydrophilic "branch builder" macrodiols of the following general structure: $HOCH_2$—X(Hydrophilic Polymer)-$CH_2OH$, where X equals a designed connecting group, and the Hydrophilic Polymer is a biocompatible oxidatively/hydrolytically/biologically stable segment, e.g., poly(2-methyl-2-oxazoline) (PMeOx), or poly(N,N-dimethyl acryl amide) (PDMAAm), or poly(β-methyl alanoid) (PMeA), which can be synthesized to sufficient molecular weights (e.g., in one embodiment from about 500 to about 5,000 g/mol) to give continuous phase-separated domains. The macrodiols together with the soft segment HO-PDMS-OH and the extender HO—$(CH_2)_4$—OH will react with the diisocyanate MDI and will produce a molecular architecture that yields the target morphology. FIG. 4 outlines one possible proposition in accordance with the present invention and illustrates four starting materials and the amphiphilic graft produced at one specific stoichiometry. In FIG. 4, the overall structure of the graft reflects one example of a specific stoichiometry of the starting materials: MDI/HO—PDMS-OH/BD/HOCH$_2$—X (Hydrophilic Polymer)-CH$_2$OH=6/3/1/2 (where the squares represent the MDI derived-portion of the molecular structure, the dots 1,4-BD derived-portion of the molecular structure, the horizontal squiggles HO-PDMS—OH derived-portion of the molecular structure, and the vertical squiggles are hydrophilic chains with "branch builders").

Regarding the reaction disclosed in FIG. 4, as would be apparent to those of skill in the art, the present invention is not limited thereto. Rather, any suitable isocyanate/polyol combination can be used to produce the urethane portion of the amphiphilic network of the present invention. Additionally, the reaction scheme of FIG. 4 is not limited to solely the use of a PDMS hydrophobic polymer shown therein. Rather, any of the above-mentioned hydrophobic polymer compounds discussed above can be used therein.

In one embodiment, the repeating units of the polymers illustrated in FIG. 4 are as follows: x is an integer selected from 2 to about 5,000, or from about 5 to about 3,500, or from about 10 to about 2,500, or from about 25 to about 1,000, or even from about 40 to about 500, while n is an integer selected from about 5 to about 5,000 repeating polymer units, or from about 10 to about 2,500 repeating polymer units, or from about 25 to about 1,000 repeating polymer units, or even from about 40 to about 500. Here, as well as elsewhere in the specification and claims, individual range limits can be combined to form additional non-disclosed ranges.

In one embodiment, the overall composition of the graft can be controlled by the —NCO/—OH stoichiometry and the molecular weights of the segments. According to orienting experiments, such structures can be obtained by using strict —NCO/—OH stoichiometry and by controlling the addition sequence of the ingredients.

In another embodiment, the synthesis of TP-APCNs in accordance with the present invention is accomplished by blending an amphiphilic graft polymer, poly(dimethyl acryl amide)-g-polydimethylsiloxane (PDMAAm-g-PDMS) with, for example, a PDMS-containing polyurethane (PU). The number of repeating units in the individual polymer starting materials of this embodiment are individually selected from the ranges described above.

In this embodiment, the PDMS segments common to both starting materials coalesce to form a single soft PDMS phase, while the hard/crystalline segments of the PU physically crosslink the entire blend. In one instance, the properties of these TP-APCNs can be controlled by the graft/PU blending ratio and the molecular weights of the constituent segments, and reflect those of the starting materials. By controlling the relative amounts and molecular weights of the constituents, TP-APCNs with co-continuous hydrophilic and hydrophobic phases are prepared. Phase co-continuity is demonstrated by swelling studies with water and n-heptane. Depending on the blend ratio and constituent molecular weights, TP-APCNs that exhibit a tensile strength of about 0.5 to about 4 MPa, an elongation of about 70 to about 280 percent, together with about a 2 to about an $11 \times 10^{-7}$ cm$^2$/s glucose permeability, and about a 1.2 to about a $8 \times 10^{-8}$ cm$^2$/s insulin permeability can be prepared. These TP-APCNs are useful as biomaterials because both blend components are biocompatible and biostable.

Figure 5:
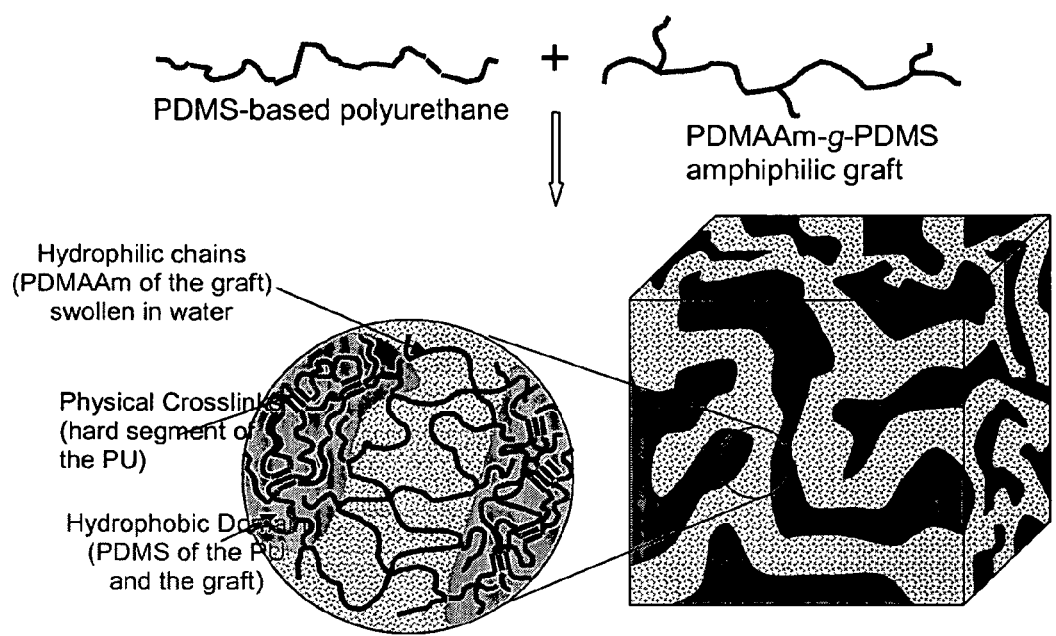
FIG. 5 illustrates another possible morphology of physically-crosslinked processable TP-APCNs in accordance with the present invention.

In one embodiment, in contrast to the by now well-known chemically (i.e., permanently) crosslinked APCNs, the TP-APCNs of the present invention are processable/re-formable thermally or by solution casting. Another advantage of TP-APCNs of the present invention over permanently crosslinked APCNs is their simplified synthesis, specifically, the elimination of chemical crosslinking. In one embodiment, TP-APCNs in accordance with the present invention can be assembled by blending of two segmented polymers in which one of the segments, common to both blend components, aggregates to a common phase that gives rise to physical crosslinks. This embodiment is illustrated by FIG. 5. In FIG. 5, a blend of a PDMS-based PU with PDMAAm-g-PDMS is illustrated. In this embodiment, the hydrophilic PDMAAm backbone of the graft phase-separates (shown in the middle of the close-up circle) from the hydrophobic PDMS phase (shown at either side of the close-up circle) that arose by aggregation of the common PDMS constituents of the blend.

FIG. 5 outlines the synthesis principle and helps to visualize the nano-architecture of a TP-APCN, specifically that obtained by blending a PDMS-based PU with an amphiphilic graft copolymer, PDMAAm-g-PDMS. The PDMS segments common to the linear PU and the amphiphilic graft coalesce (by hydrophobic forces) to a single homogeneous PDMS phase, while the phase-separated hydrophilic PDMAAm graft backbones remain covalently attached to the common hydrophobic PDMS phase. Thus, in this embodiment, the hard/crystalline segments of the PU function as physical crosslinks for the entire blend. Further the common PDMS segments prevent macroscopic phase separation over the entire composition range.

In this embodiment, this morphology preserves the desirable mechanical properties of the PU because the weak hydrophilic segment does not become part of the load bearing elements of the co-network. Similarly to conventional APCNs, the $M_{c,HI}$ (the molecular weight of the hydrophilic segment between hydrophobic crosslinking sites) determines the transport properties (i.e., the molecular weight cut off range) of the TP-APCN. The $M_{c,HI}$ can be controlled by the overall blend composition and graft molecular weight, and can be varied within wide limits.

Exemplary strategies for the precision syntheses of the three "branch-building" macrodiols will now be discussed. It should be noted that the present invention is not limited to just the strategies below and should be broadly construed.

(1) PMeOx Macrodiol:

The living cationic ring opening polymerization of 2-methyl-2-oxazoline (MeOx) (an inexpensive commercially available monomer) in acetonitrile to high molecular weight narrow distribution polymers, and its quantitative termination with amines is well documented. Poly(2-ethyl-2-oxazoline) is a FDA approved biocompatible and biostable indirect food additive, and PMeOx is also reported to be biocompatible. Termination of MeOx polymerization with $NH(CH_2CH_2OH)_2$ and purification with an ion-exchange resin afforded the PMeOx macrodiol in good yield.

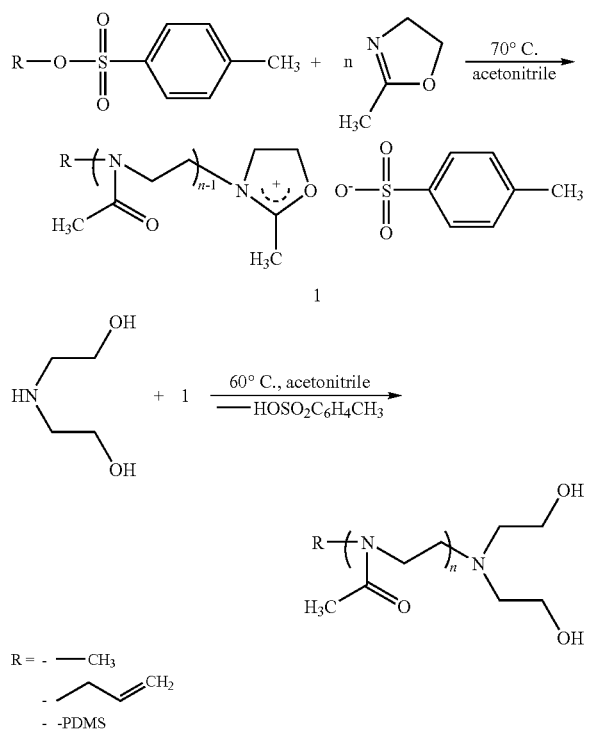

Figure 6:
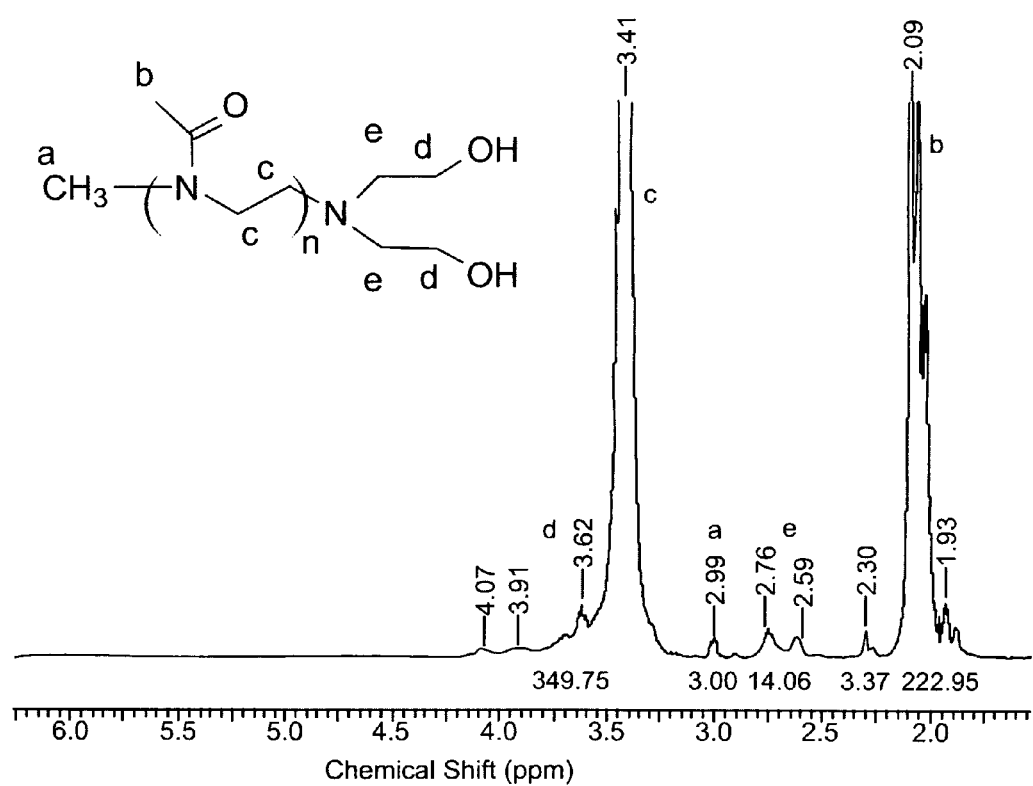
FIG. 6 is a $^1$H-NMR spectrum of a PMeOx macrodiol.

FIG. 6 shows the $^1H$ NMR spectrum of a representative PMeOx macrodiol branch-builder ($M_n$=6,000 g/mol) together with assignments.

The end group of the PMeOx segment can be readily functionalized by the use of toluene sulfonic acid derivatives and thus functionalized (methyl, allyl, or PDMS) TP-APCNs can be obtained. These terminally functionalized branches lead to further novel intermediates. PMeOx branches terminally functionalized by PDMS (see R=PDMS above) would be of particular interest because such PDMS segments may associate with PDMS segments in the PU backbone, and enhance mechanical strength.

Figure 7:
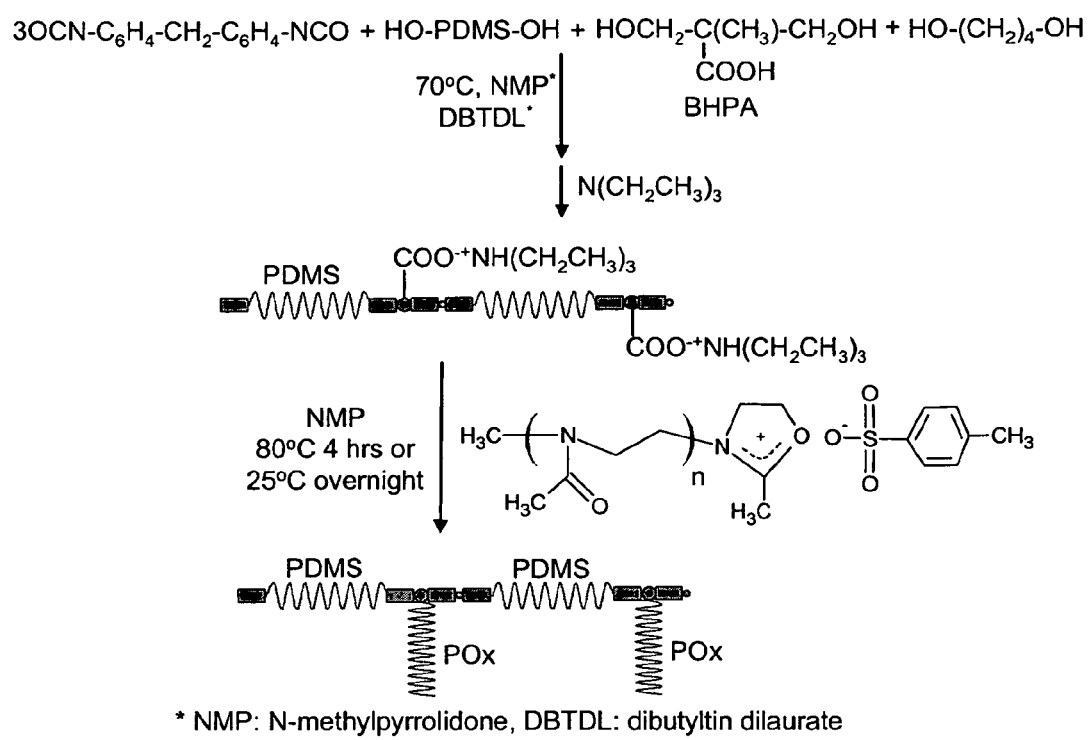
FIG. 7 illustrates one possible strategy for the synthesis of PUs containing PMeOx branches.

Another possible strategy for the synthesis of PUs containing PMeOx branches is summarized in FIG. 7. The starting materials is 3 moles of MDI plus molar quantities of HO—PDMS—OH, 1,4-BD, plus 2,2-bis(hydroxymethyl) propionic acid (BHPA). The PU obtained contained —COOH groups neutralized with $Et_3N$. The termination of living MeOx polymerization by tert-amine carboxylates is known to those of skill in the art. This PU-carboxylate is used as a terminating agent for the living cationic polymerization of MeOx (see above), and thus the target PU backbone carrying PMeOx branches is obtained. $^1H$ NMR spectroscopy indicated the expected structure after extraction in water (i.e., a resonance at 0.07 ppm for $Si(CH_3)_2$ and at 2.09 ppm for $CO(CH_3)$). The final composition/properties of the amphiphilic PU-grafts can be controlled by the stoichiometry and molecular weights of the ingredients.

(2) PMeA Macrodiol:

In one embodiment, the present invention seeks to use as hydrophilic branches poly(β-methyl alanoid) [(—CO—N (CH$_3$)—CH$_2$CH$_2$—), PMeA]. PMeA is isomeric with PMeOx, and is of considerable interest due to its biomimetic structure (except for the —CH$_3$ substituent the structure is isomeric with alanine). An inexpensive synthesis of PMeA is known to those of skill in the art and involves the living alternating copolymerization of CO and methyl aziridine by $CH_3COCo(CO)_4$ catalyst.

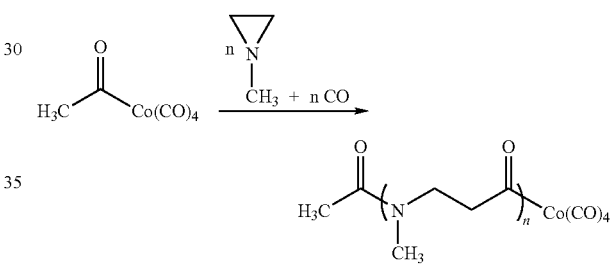

In one embodiment, PMeA is synthesized by living cationic polymerization using $CH_3COCo(CO)_4$ catalyst generated in situ from $Co(CO)_4Na+CH_3I$ or from the isolated $CH_3COCo(CO)_3$ $P(o\text{-tolyl})_3$. The alternating living copolymerization of CO plus methyl aziridine will be terminated by 2-amino-2-methyl-1,3-propanone diol, and thus the target PMeA macrodiol will be obtained.

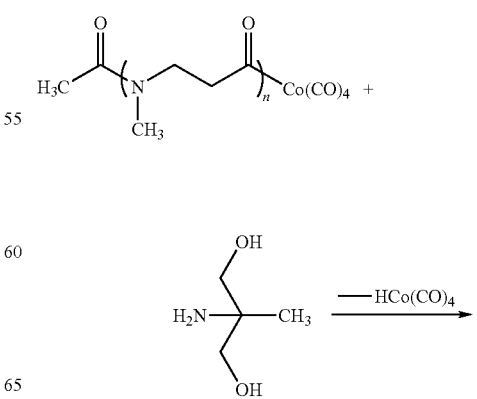

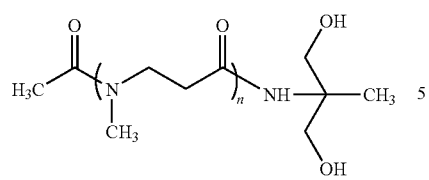

The terminating agent is commercially available and inexpensive. A series of PMeA macrodiols with molecular weights in the range of about 500 to about 5,000 g/mol range can be prepared and characterized, and can provide hydrophilic branches of PUs to obtain a series of TP-APCNs.

(3) PDMAAm Macrodiol:

PDMAAm is highly hydrophilic and biocompatible and thus can be used in one embodiment of the present invention to produce the TP-APCNs of the present invention. The target branch-building macrodiol is synthesized by initiating the atom transfer radical polymerization (ATRP) of DMAAm with propanoic acid-2-bromo-2-methyl-3-hydroxy-2-(hydroxymethyl)-2-methylpropyl ester.

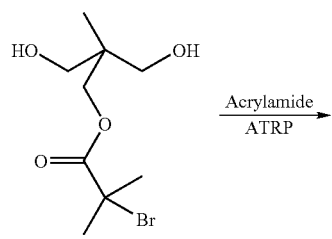

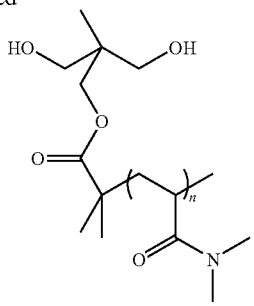

The above polymerization reaction is efficient and produces nearly quantitative yields of the desired macrodiol.

Table 1 shows synthesis conditions and summarizes initial results of experiments carried out to explore the feasibility of TP-APCN synthesis by the use of the PMeOx hydrophilic branches. Sample 1 is prepared with the PMeOx macrodiol prepared by $NH(CH_2CH_2OH)_2$ termination while Samples 2 through 5 by BHPA (see PMeOx Macrodiol section above). A series of products containing various amounts of PDMS (30-50%) and PMeOx (20-40%) are prepared using PDMS of $M_n=1,100$ and PMeOx of $M_n=600$ to 2,600 g/mol. Thin films (90 130 μm) are prepared by solvent casting in N-methylpyrrolidone (NMP). The products contain small amounts (3 to 5%) of toluene soluble fractions indicating essentially complete incorporation of HO—PDMS—OH. After extraction in water, the amount of PMeOx branches incorporated into the PU backbone is determined by $^1$H NMR spectroscopy. The ratio of resonances associated with the PDMS to PMeOx indicate the expected structure (i.e., a resonance at 0.07 ppm for $Si(CH_3)_2$ and at 2.09 ppm for $CO(CH_3)$). Importantly, all the samples swell in both water and heptane, which indicates domain co-continuity and therefore the existence of processable TP-APCNs.

TABLE 1

Synthesis, Characterization, and Properties of TP-APCNs Prepared with PMeOx

| | Sample 1 | Sample 2 | Sample 3 | Sample 4 | Sample 5 |
|---|---|---|---|---|---|
| Synthetic conditions | | | | | |
| MDI wt % (mol ratio) | 20 (2) | 23 (3) | 28 (3) | 23 (3) | 23 (3) |
| PDMS1100 wt % (mol ratio) | 52 (1) | 33 (1) | 41 (1) | 33 (1) | 33 (1) |
| BHPA wt % (mol ratio) | 4 (1) | 8 (2) | 5 (1) | 4 (1) | 4 (1) |
| BD wt % (mol ratio) | — | — | 3 (1) | 3 (1) | 3 (1) |
| PMeOx wt % (Molecular Weight, g/mol) | 24 (MW = 600) | 36 (MW = 600) | 22 (MW = 600) | 38 (MW = 1200) | 38 (MW = 2600) |
| Solvent | DMAc/THF[a] (1:1) | NMP[a] | NMP | NMP | NMP |
| Characterization | | | | | |
| Toluene extractable, % | — | 3 | 5 | 3 | 4 |
| Equilibrium swelling in water, % | 60 | 140 | 23 | 31 | 50 |
| Equilibrium swelling in n-heptane, % | 12 | 15 | 21 | 23 | 16 |
| Ratio of PDMS/PMeOx resonances by $^1$H-NMR | 6 | 3 | 5 | 3 | 3 |

TABLE 1-continued

Synthesis, Characterization, and Properties of TP-APCNs Prepared with PMeOx

|  | Sample 1 | Sample 2 | Sample 3 | Sample 4 | Sample 5 |
|---|---|---|---|---|---|
| Properties[b] | | | | | |
| Tensile strength, MPa | <1 | <1 | 8 | 6 | 2 |
| Elongation at break, % | | | 25 | 30 | 20 |

[a]DMAc = dimethyl acetamide, THF = tetrahydrofuran, NMP = N-methylpyrrolidone
[b]in water swollen state Samples 1 and 2 indicate that the hydrophilicity of the samples increases (i.e., water-swelling increases) by increasing the amount of PMeOx (at the same molecular weight). Samples 3 and 4 clearly show the effect of PMeOx weight percent by varying PMeOx molecular weight at the same stoichiometry (i.e., MDI:HO—PDMS—OH:BHPA:BD=3: 1:1:1, molar ratio). The addition of BD significantly improves mechanical properties because this chain extender leads to crystalline crosslinking sites. Indeed, Sample 3 is much stronger (manual examination) than Samples 1 or 2 prepared in the absence of BD. However, increasing the number of physical crosslinking sites reduces hydrophilicity, i.e., reduces water-swelling (see Sample 3). Samples 4 and 5 show the effect of PMeOx molecular weight at the same stoichiometry and weight percent. Increasing the molecular weight of PMeOx at the same weight percent increases water swelling and decreases mechanical strength.

Thermoplastic Amphiphilic Co-Networks by Blending:

In one embodiment, the present invention seeks to create TP-APCNs crosslinked by biocompatible-biostable hydrophilic segments by blending PDMS-based PUs with precision-synthesized PDMS-b-(Hydrophilic Polymer)-b-PDMS triblocks, or (Hydrophilic Polymer)-g-PDMS grafts (Hydrophilic Polymer=PMeOx, or PMeA, or PDMAAm). The common PDMS segments aggregate and phase separate, and produce a new family of TP-APCN hydrogels containing physically-crosslinked co-continuous hydrophilic and hydrophobic domains. The transport and mechanical properties of these TP-APCNs can, in one embodiment, be controlled by the blending ratio and the molecular weights of the various segments and will be intermediate between those of the blend constituents.

Earlier permanently-crosslinked APCNs that contain crosslinked hydrophilic chains/domains, which have a selective permeability—mechanical properties relationship, can be, in one embodiment, controlled by the amount and length (molecular weight) of the hydrophilic segments. Co-continuity of the hydrophilic domain is, in one embodiment, necessary for the permeation of water-soluble molecules through membranes, and the molecular weight of the hydrophilic segment ($M_{c,hydrophilic}$) controls permeability. The mechanical properties are controlled by the crosslinked hydrophobic chains. PUs are essentially alternating soft-hard segment block copolymers, therefore the chemical crosslinking of any of the segments would lead to unprocessable co-networks, therefore the chemical crosslinking of any of the segments would lead to unprocessable products. Because the present invention seeks to create processable APCNs with physically-crosslinked hydrophilic segments, one way around this conundrum is to chemically separate the hydrophilic chains/domains from the hydrophobic PU backbone, i.e., by blending PUs containing PDMS segments with PDMS-hydrophilic-PDMS tri-blocks, or grafts of a hydrophilic backbone fitted with PDMS branches. FIG. 5 helps to visualize the morphology of a PDMS-based PU with PDMAAm-g-PDMS, and the molecular architecture of the construct.

The PDMS segments common to the graft and the PU coalesce into a single continuous PDMS phase, with the PDMAAm backbone of the graft producing the crosslinks between the PDMS domains. The crystalline MDI-BD units of the PU, embedded in the continuous soft PDMS phase, physically crosslink the PDMS segments, and thus the entire construct is crosslinked. The PDMS branches of PDMAAm-g-PDMS aggregate with the PDMS of the PU by hydrophobic forces.

Biocompatible/biostable TP-APCNs membranes (e.g., for immunoisolation of living tissue) can be made of blends by the use of a PDMS-based PU plus any PDMS-hydrophilic-PDMS tri-block (in which the middle-segment is PMeOx, or PMeA or PDMAAm, see above), or with grafts in which the backbone is hydrophilic (i.e., PMeOx, or PMeA or PDMAAm) and the branches are PDMS. The PDMS segments aggregate and give rise to physically crosslinked TP-APCNs.

The blends can be readily prepared by dissolving the two blend components in a common solvent or solvent mixture, and evaporating the solvent(s). Thus, membranes can be made by casting, spraying, dipping, and coating (see below).

Orienting Experiments:

In one embodiment, in a THF common solvent are blended various proportions of PDMAAm-g-PDMS ($M_{n,PDMAAm}$=30,000 g/mol and $M_{n,PDMS}$=9,000 g/mol) with a commercially available PDMS-based PU (Elast-Eon of AorTech Biomaterials, Victoria, Australia). Blends obtained after solvent evaporation are homogeneous colorless optically-clear transparent sheets exhibiting excellent mechanical properties on manual examination. The optical properties of the films suggest blending at the nanoscale. Importantly, all the blends swell in both water and n-heptane indicating co-continuous hydrophilic/hydrophobic domains. Table 2 shows the blend ratios and preliminary data related thereto. Equilibrium water-swelling increases with the amount of PDMAAm in the blend.

TABLE 2

Blending Ratios and Initial Data of Blends of PDMAAm-g-PDMS with a PDMS-based PU

|  | Sample 1 | Sample 2 | Sample 3 |
|---|---|---|---|
| Blending conditions | | | |
| PDMS-based PU, weight percent | 15 | 25 | 35 |
| PDMAAm-g-PDMS, weight percent | 85 | 75 | 65 |

TABLE 2-continued

Blending Ratios and Initial Data of
Blends of PDMAAm-g-PDMS with a PDMS-based PU

|  | Sample 1 | Sample 2 | Sample 3 |
|---|---|---|---|
| Characterization | | | |
| Equilibrium swelling in water, percent | 230 | 150 | 55 |
| Glucose permeability, ×10$^{-6}$ cm$^2$/s | 1.1 | 0.5 | 0.14 |
| Tensile strength, $^a$MPa | | 5.2 | |

$^a$in water swollen state

EXPERIMENTAL

Materials

N,N-dimethyl acryl amide (DMAAm), azobisisobutyronitrile (AIBN), and toluene are from Aldrich and purified prior to use. Hexanes and n-heptane are from Fisher Scientific. Methacrylate-terminated PDMS (PDMS-MA) is from Gelest and is used without purification. PDMS-based PU (Elast-Eon E2A of AorTech Biomaterials, Victoria, Australia) contains 50% PDMS soft segment, 10% poly(hexamethylene oxide) soft segment, together with 40% hard segments, the latter assembled of methylene-p-phenyl diisocyanate and 1,4-butane diol ($M_n$=199 kDa; $M_w/M_n$=2.65). Glucose, insulin, and bovine serum albumin (BSA) are from Aldrich and are used without further purification.

Synthesis of PDMAAm-q-PDMS:

DMAAm and PDMS-MA are copolymerized by AIBN in toluene solution. The synthesis of a representative graft is as follows: DMAAm (5.06 grams), PDMS-MA (2.72 grams), and AIBN (8.38 mg) are dissolved in toluene (70 grams) at room temperature and are placed in a 100 mL round-bottom flask equipped with a Teflon-coated stirring bar. Nitrogen gas is purged through the solution for 5 minutes, and the flask with the charge is closed. To obtain 100% DMAAm conversion, the charge is stirred and heated for 24 hours, and to obtain conversions in the range of about 15 to about 35 percent, it is stirred for about 2 to about 4 hours. The solid content of the system is 10 percent, and the ratio of DMAAm to AIBN is 1000. Prior to characterization, the polymers are purified by extraction with hexanes to remove unreacted DMAAm and PDMS-MA.

Film Casting:

Films of blends are prepared by dissolving the two blend components (PDMAAm-g-PDMS and PDMS-based PU) in the common solvent THF, pouring the solution into a Teflon mold (7 cm×7 cm), and removing the THF by drying until constant weight at room temperature. To reduce the rate of solvent evaporation (i.e., to prevent bubble formation), the mold is covered with aluminum foil. The thickness of the films is about 100 μm.

Characterization:

Equilibrium swellings (S) of blends in water and n-heptane are determined at room temperature, and calculated by $S=(S_{wet}-S_{dry})/S_{dry}\times100(\%)$, where $S_{wet}$ and $S_{dry}$ are the weights of wet and dry samples, respectively.

Weight loss of blends as a function of time is determined by placing films of blends (dimensions about 5×4×0.01 cm) in water, and shaking the samples for various times (i.e., 8, 21 days, etc.) at 150 rpm and 37° C., removing the samples from the water, and drying in vacuum. The weights of the dry films are determined and weight loss is calculated by $W=(W_o-W_t)/W_o$, where $W_o$ and $W_t$ are the weights of dry samples at time 0 and time t, respectively.

GPC eluograms are obtained with a Waters GPC instrument with samples dissolved in THF, at a flow rate of 1 mL THF/min. The molecular weights are estimated against polystyrene standards. DSC is performed by a DSC Q2000 (TA instrument) under a nitrogen atmosphere, with 10° C./min heating and cooling rate. TGA is performed by a TGA Q500 (TA instrument) under a nitrogen atmosphere, with 20° C./min heating rate.

Mechanical Properties:

Stress/strain traces of dumbbell shaped samples (2.5 cm long, 0.35 cm width at the neck) are determined by the ISO 527 S2 method using an Instron 5543 tester with 1 kN force and 12 mm/min crosshead speed. The Merlin 3.11 software is used for data analysis. Measurements are carried out with 3 dumbbells in the water-swollen state whose averages are reported. Measurements are completed in less than 5 minutes to minimize the drying of the samples.

Permeabilities of Glucose, Insulin, and Bovine Serum Albumin (BSA):

Details of permeability experiments involving glucose, insulin, and BSA through polymer films are described.

Compression Molding:

TP-APCN samples (about 0.25 grams) are placed between two sheets of Teflon coated aluminum sheets and are placed between the plates of a laboratory press (Carver Inc., Summit, N.J.). The platens are heated to 100° C. and the samples are compression molded at 5000 lbs for 1 min. After cooling to room temperature, the films are recovered manually.

Figure 8:
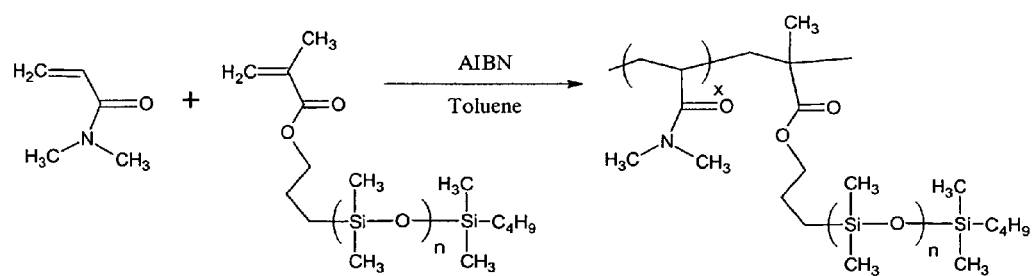
FIG. 8 illustrates one possible synthesis route for PDMAAm-g-PDMS.

Results and Discussion:

Synthesis of Amphiphilic Graft Polymers:

Amphiphilic graft PDMAAm-g-PDMSs are prepared by free radical mediated copolymerization of DMAAm with methacrylate-terminated PDMS (PDMS-MA) of 900 and 5000 g/mol. FIG. 8 shows the structures of the reactants and that of the amphiphilic graft.

Figure 9:
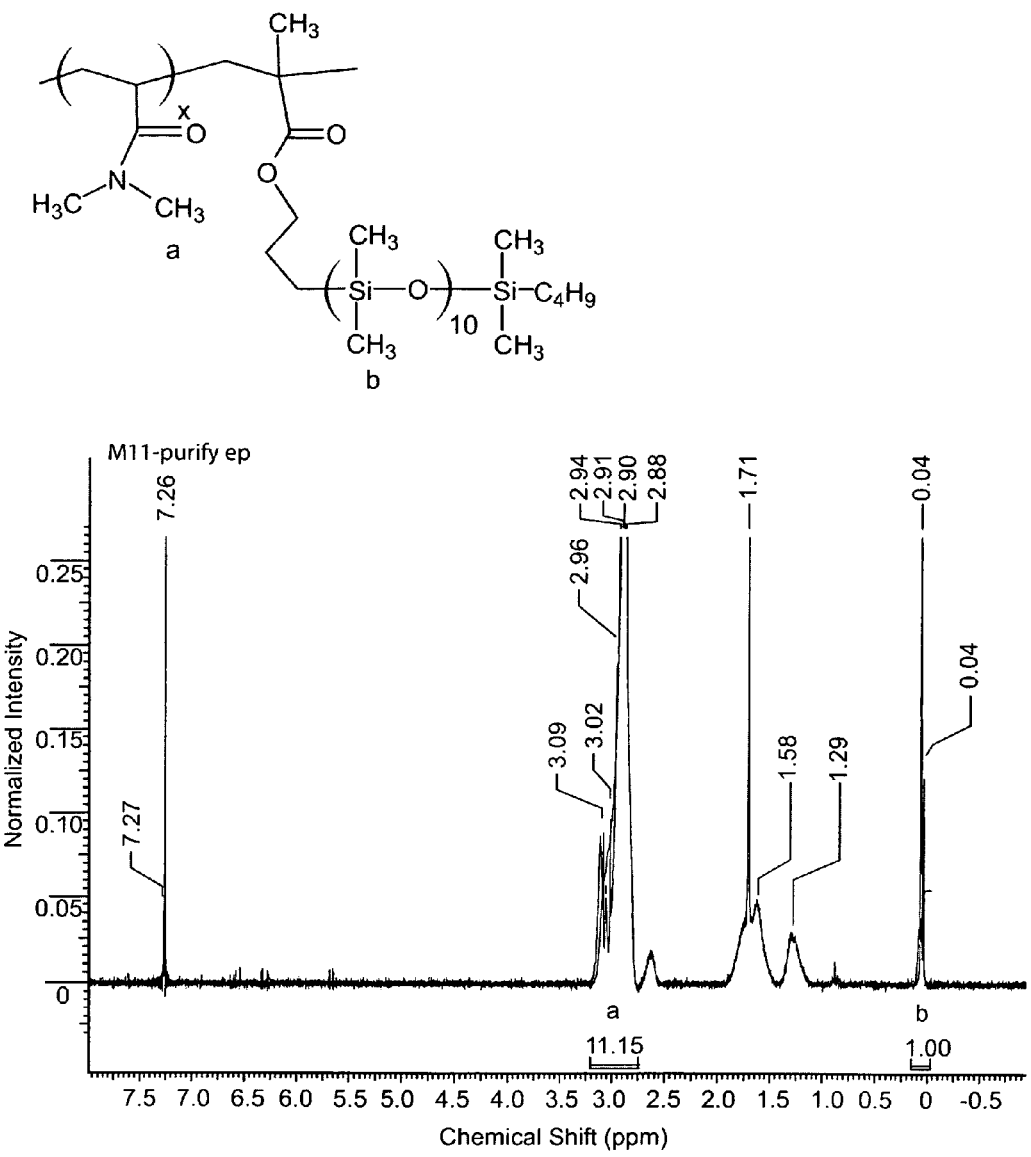
FIG. 9 is a $^1$H-NMR spectrum of a graft polymer (PDMAAm$_{93}$-g-PDMS$_9$0.9K (M$_c$~12K), see Table 3)

FIG. 9 shows the $^1$H-NMR spectrum of a representative PDMAAm-g-PDMS. The degree of polymerization of DMAAm between PDMS branch points ($M_{c,PDMAAm}$), i.e., x in FIG. 8, is calculated by comparing the intensities of the methyl groups on PDMAAm and those of PDMS, and considering the known molecular weight of the PDMS.

Table 3 summarizes the various grafts synthesized. The first two products in the table are obtained by the use of PDMS-MA of $M_n$=5000 and 900 g/mol at 100% DMAAm conversion. Further samples are prepared with PDMS of $M_n$=900 g/mol plus DMMAm at lower conversions (35, 25 and 15%) so as to obtain grafts in which the PDMAAm sequence lengths between the branching sites $M_{c,PDMAAm}$ are more uniform. Because the reactivity ratio of the DMAAm/PDMS-MA pair is not known (and because the reactivity ratio of an acrylamide/methacrylate pair is most likely not unity), in one embodiment it is prudent to synthesize grafts at low DMAAm conversions; at low conversions grafts with statistically more uniform $M_{c,PDMAAm}$ distributions are expected to arise. Indeed, the decreasing $M_w/M_n$ values with decreasing DMAAm conversions suggest narrower MWDs, which in turn may be due to narrower and more uniform $M_{c,PDMAAm}$ distributions. Molecular weights and their distributions are determined by GPC, and $M_{c,PDMAAm}$s are calculated from the known MW of PDMS.

TABLE 3

Inventory of Grafts Prepared

| Polymer* | PDMAAm$_{66}$-g-PDMS$_{34}$5K | PDMAAm$_{93}$-g-PDMS$_{7}$0.9K | PDMAAm$_{93}$-g-PDMS$_{7}$0.9K (Mc~12K) | PDMAAm$_{96}$-g-PDMS$_{4}$0.9K (Mc~23K) | PDMAAm$_{98}$-g-PDMS$_{2}$0.9K (Mc~42K) |
|---|---|---|---|---|---|
| Synthesis Conditions | | | | | |
| DMAAm (conv. %) | 100 | 100 | 35 | 25 | 15 |
| ° C. | 55 | 65 | 65 | 55 | 55 |
| Molecular Weights and Distributions | | | | | |
| M$_n$(kDa)-M$_w$/M$_n$ | 49-2.1 | 27-2.0 | 41-1.9 | 57-1.8 | 57-1.7 |

*The abbreviation of the grafts indicates the weight % of the components in the subscripts, and the MW of the PDMS segment ×1000; for example PDMAAm$_{66}$-g-PDMS$_{34}$5K indicates a graft containing 66% PDMAAm and 34% PDMS, containing a PDMS segment of 5000 g/mol. In case M$_{c,PDMAAm}$ is calculated, this is indicated by digits in parentheses; for example, M$_{c,PDMAAm}$ = 12,000 g/mol is abbreviated by (Mc~12K).

Blending Various Grafts with a Polyurethane:

Graft polymers are blended with PDMS-based PU in THF solvent, and films are prepared by casting. The PDMS branches of the graft coalesce with the PDMS soft segments of the PU, and the crystalline/hard segments of the PU physically crosslink the entire blend. This interaction leads to mechanical properties sufficient for various biomedical applications (see below).

Table 4 summarizes the blends prepared. The graft/PU blending ratio is in the about 85/15 to about 65/35 percentage range. The amounts of water extractables are low (about 4 to about 13 percent), which indicates strong cohesion between the graft and the PU. These blends constitute a new type of thermoplastics, TP-APCNs.

Demonstrating Phase Co-Continuity:

In order APCNs to exhibit extraordinary transport properties, the co-networks must have co-continuous (percolating) hydrophilic and hydrophobic phases. Hydrophilic/hydrophobic phase co-continuity is demonstrated by swelling studies, i.e., by placing the co-networks in differentiating solvents, e.g., water and n-heptane, and determining their swelling characteristics. Swelling in both water and n-heptane indicates phase co-continuity.

Figure 10:
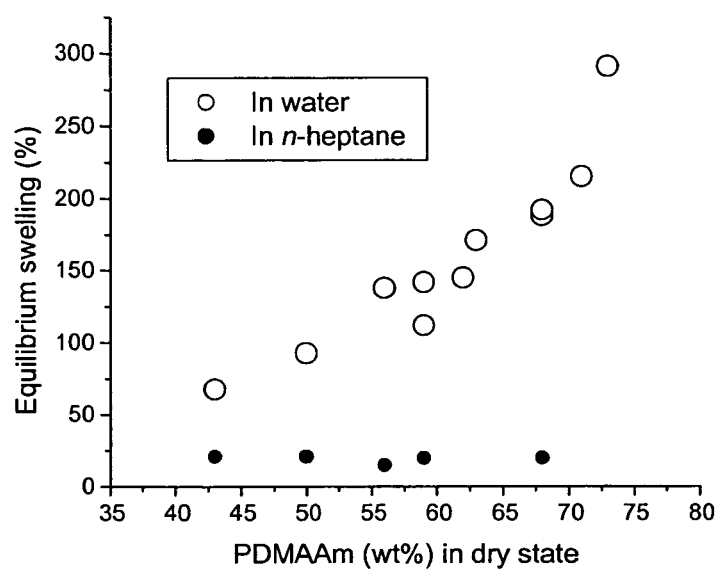
FIG. 10 is a graph illustrating equilibrium swelling in water and in n-heptane as a function of PDMAAm content in blends.

A series of experiments are carried out in which various graft/PU blends are exposed to water and n-heptane, and their equilibrium swelling is determined. As seen by the data in Table 4, all the blends swell in both water and n-heptane. Swelling in water increases with the amount of PDMAAm in the blend (see FIG. 10). All the blends also swell in n-heptane (15 to 21%), however, the data is insufficient to establish a trend. Overall, the data demonstrates phase co-continuity.

TABLE 4

Inventory of Blends Prepared Together with their Composition and Characterization

| Graft | PDMAAm$_{66}$-g-PDMS$_{34}$5K | | | PDMAAm$_{93}$-g-PDMS$_{7}$0.9K | | PDMAAm$_{93}$-g-PDMS$_{7}$0.9K (Mc~12K) | | PDMAAm$_{96}$-g-PDMS$_{4}$0.9K (Mc~23K) | | PDMAAm$_{98}$-g-PDMS$_{2}$0.9K (Mc~42K) | |
|---|---|---|---|---|---|---|---|---|---|---|---|
| Composition | | | | | | | | | | | |
| graft/PU (wt %) | 65/35 | 75/25 | 85/15 | 65/35 | 75/25 | 65/35 | 75/25 | 65/35 | 75/25 | 65/35 | 75/25 |
| PDMAAm (wt %) | 43 | 50 | 56 | 60 | 70 | 60 | 70 | 62 | 72 | 64 | 74 |
| PDMS (wt %) | 40 | 38 | 36 | 22 | 18 | 22 | 18 | 20 | 16 | 19 | 14 |
| Hard segment (wt %) | 14 | 10 | 6 | 14 | 10 | 14 | 10 | 14 | 10 | 14 | 10 |
| Hard segment in the water swollen membrane (wt %) | 8.5 | 5.2 | 2.5 | 6.7 | 3.5 | 5.9 | 3.5 | 5.8 | 3.2 | 5.2 | 2.6 |
| Characterization | | | | | | | | | | | |
| Water extractable (wt %) | 4 | 5 | 6 | 7 | 11 | 6 | 5 | 8 | 12 | 11 | 13 |
| Melting point (° C.) | 71 | 70 | | 83 | 62 | | | | | | |
| Equilibrium swelling | | | | | | | | | | | |
| in water (%) | 68 | 93 | 138 | 112 | 188 | 142 | 197 | 145 | 215 | 171 | 291 |
| in n-heptane (%) | 21 | 21 | 15 | 20 | 20 | | | | | | |

Figure 11:
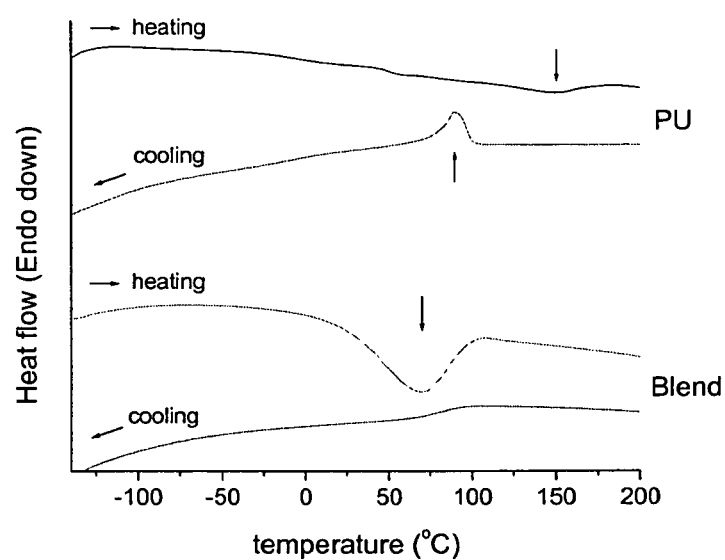
FIG. 11 is a graph illustrating DSC curves of PU and a blend of 65/35% PDMAAm$_{66}$-g-PDMS$_{34}$5K/PU (arrows indicate melting or crystallization temperatures)

Thermal Characterization of Blends:

FIG. 11 shows DSC heating curves of the PDMS-based PU and a representative graft/PU blend. The PU contains crystalline/hard segments whose melting point appears at about 150° C. The blend also shows a melting point, however, it decreases to about 70° C. because the crystallizable hard segment content decreases from 40% (in the PU) to 14% (in the blend). As is known to those of skill in the art, the blending of crystalline polymer with an amorphous polymer may result in melting point depression. For example, the thermal behavior of blends of crystalline poly(vinylidene fluoride) (PVDF) with amorphous poly(methyl methacrylate) (PMMA) have been studied and it has been found that the melting point of PVDF decreases in proportion to the added PMMA. While a blend system in accordance with one embodiment of the present invention is more complicated than the PVDF/PMMA blend, a similar trend is observed. That is, the melting point of the blend decreased upon the addition of the amorphous PDMAAm-g-PDMS graft to the crystallizable PU.

FIG. 11 also shows the DSC cooling curves of the PU and that of a blend. The crystallization temperature of the hard segment in the PU is about 90° C.; however, crystallization does not occur after blending the PU with the graft. On the other hand, had the glassy PDMAAm not disturb crystallization, the crystallization temperature of the hard segment would have been observed somewhere below 70° C. Thus, it is suggested that upon cooling, the liquid PDMAAm becomes glassy at about 100° C., and that the glassy PDMAAm phase disturbs the aggregation of hard PU segments, which prevents their crystallization. In contrast, by solvent casting at room temperature the PDMAAm segments remain mobile and microphase separation can occur. Microphase separation of the soft and hard segments in PU is essential to obtain satisfactory mechanical properties.

Figure 12:
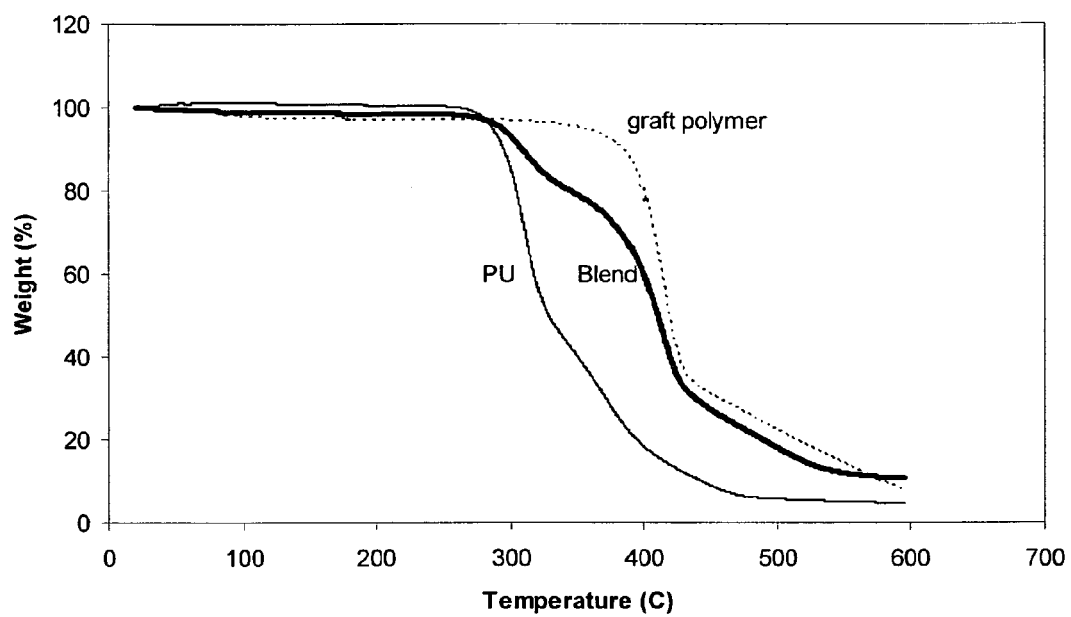
FIG. 12 is a graph illustrating TGA curves of PU, a graft polymer (PDMAAm$_{66}$-g-PDMS$_{34}$5K), and a blend (75% PDMAAm$_{66}$-g-PDMS$_{34}$5K and 25% PU)

FIG. 12 shows TGA traces of the PU, a representative graft, and a blend. The PU starts to degrade at about 270° C., and the graft at about 380° C. The PU is more vulnerable to heat degradation than the graft. Blending the PU with a graft leads to a thermally quite stable system, with the blend exhibiting a two-step degradation at temperatures intermediate between the degradation temperature of PU and that of the graft.

Blend Integrity:

The cohesion between the PDMS of the graft and that of the PU is studied by exposing various blends to water for extended periods of time and determining the water soluble fraction (weight loss). No weight loss, or insignificant weight loss, would indicate a high degree of cohesion between the phases.

Table 5 shows weight loss of water-swollen blends as a function of time (see Experimental for conditions). Grafts containing 5000 and 900 g/mol PDMS segments, and blends with 25 and 35% PU are examined. The weight loss is insignificant with decreasing PDMS molecular weight (i.e., from $PDMAAm_{66}$-g-$PDMS_{34}5K$ to $PDMAAm_{93}$-g-$PDMS_{7}0.9K$). Similarly, the amount of PU in the blends did not affect weight loss. The data suggests that a PDMS segment of $M_n$=900 g/mol is sufficient to obtain strong and stable cohesion between the common PDMS segments of the graft and the PU. The samples did not distort and did not seem to change their hydrophilic surface properties during the blend integrity test.

segment content) in the blend and the effect of the other parameters is much less significant.

The graft may be viewed as a "diluent" for the PU, a component whose presence in the blend diminishes the mechanical properties of the PU. Evidently, mechanical properties are readily controllable by blend composition (i.e., graft/PU ratio) and these properties reflect those of the starting materials.

Figure 13:
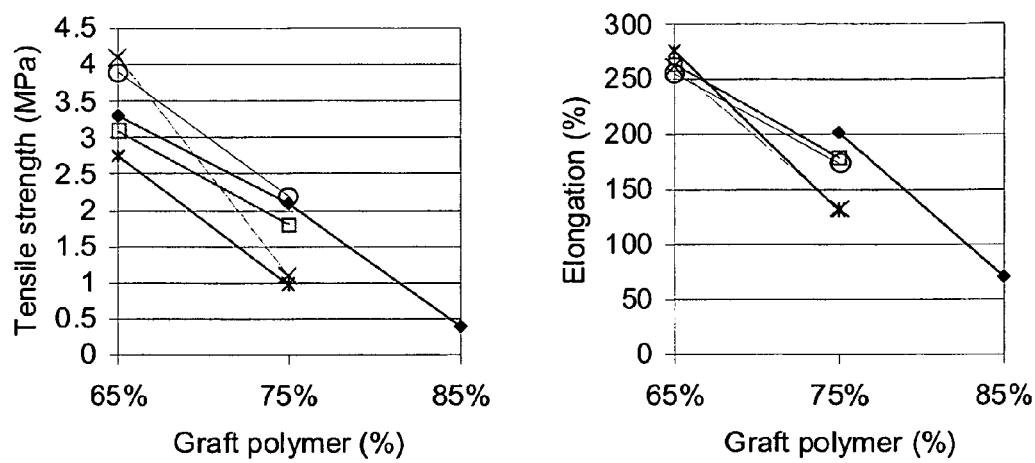
FIG. 13 are graphs illustrating tensile strength and elongation versus blend composition (♦ PDMAAm$_{66}$-g-PDMS$_{34}$5K; □ PDMAAm$_{93}$-g-PDMS$_7$0.9K; ○ PDMAAm$_{93}$-g-PDMS$_7$0.9K(Mc~12K); X PDMAAm$_{96}$-g-PDMS$_4$0.9K(Mc~23K); * PDMAAm$_{98}$-g-PDMS$_2$0.9K (Mc~42K))

The hard segments in the PU are crosslinking domains, which contribute to the strength of the co-networks. The hard segment content of water swollen TP-APCNs (see Table 4) are in the about 3 to about 8 percent range, which is relatively low for PUs. FIG. 13 shows the relation between tensile strength and hard segment content. Tensile strength decreases almost lineally with decreasing hard segment content (i.e., with increasing graft content).

These results are compared with calculated tensile strength based on that of the PU (18 MPa) with the assumption that the hard segment of the PU is diluted by addition of a graft and water (swelling in water). The experimental results are slightly lower than the calculated values. The elongations of the TP-APCNs are about half of the PU (318%). Since the relaxed state of the PU is the dry membrane, the PU frame undergoes considerable isotropic strain during water swelling, which decreases the elongation of the TP-APCNs.

Compression Molding:

Because these TP-APCNs are physically crosslinked, they are expected to be processable by thermoforming. The compression molding behavior of a representative TP-APCN, [a 65/35 blend of $PDMAAm_{93}$-g-$PDMS_{7}0.9K(Mc\sim12K)/PU$] is investigated. The sample flows satisfactorily in the press at 100° C. and gave a nice clear stiff film upon cooling the melt to room temperature. The ease of molding is of great processing advantage, particularly in the manufacture of contact lenses.

Transport Properties of Blends:

Since these TP-APCNs are originally designed for biological membrane applications (i.e., membranes for a bioartificial pancreas, extended wear soft contact lenses) we investigated their transport properties. There is a trade-off between mechanical and transport properties, therefore, in order to select a particular blend for immunoisolatory membrane, we

TABLE 5

Weight Loss of Water Swollen Blends with Time

| | Time (days) | | | | |
|---|---|---|---|---|---|
| | 8 | 21 | 29 | 42 | 111 |
| $PDMAAm_{66}$-g-$PDMS_{34}5K$/PU 65/35 | 0.35% | 0.56% | 0.42% | 0.26% | 0.45% |
| $PDMAAm_{66}$-g-$PDMS_{34}5K$/PU 75/25 | 0.89% | | 0.63% | 0.18% | 0.45% |
| $PDMAAm_{93}$-g-$PDMS_{7}0.9K$ 75/25 | 1.29% | 1.49% | | | 2.65% |

Mechanical Properties of Blends:

FIG. 13 shows the effect of blend composition on tensile strengths and elongations. Further, the figure displays the effect of two PDMS molecular weights (i.e., $PDMAAm_{66}$-g-$PDMS_{34}5K$ and $PDMAAm_{93}$-g-$PDMS_{7}0.9K$) and three $M_{c,PDMAAm}$s (i.e., $PDMAAm_{93}$-g-$PDMS_{7}0.9K(Mc\sim12K)$, $PDMAAm_{96}$-g-$PDMS_{4}0.9K(Mc\sim23K)$, $PDMAAm_{98}$-g-$PDMS_{2}0.9K(Mc\sim42K)$) on these properties. As can be seen, tensile strengths and elongations decrease with increasing graft content (i.e., decreasing amounts of PU). Thus, according to the data, the important parameter which controls strengths and elongations is the amount or PU (i.e., the hard studied the permeabilities of aqueous glucose and insulin solutions through membranes prepared of TP-APCNs.

Figure 14:
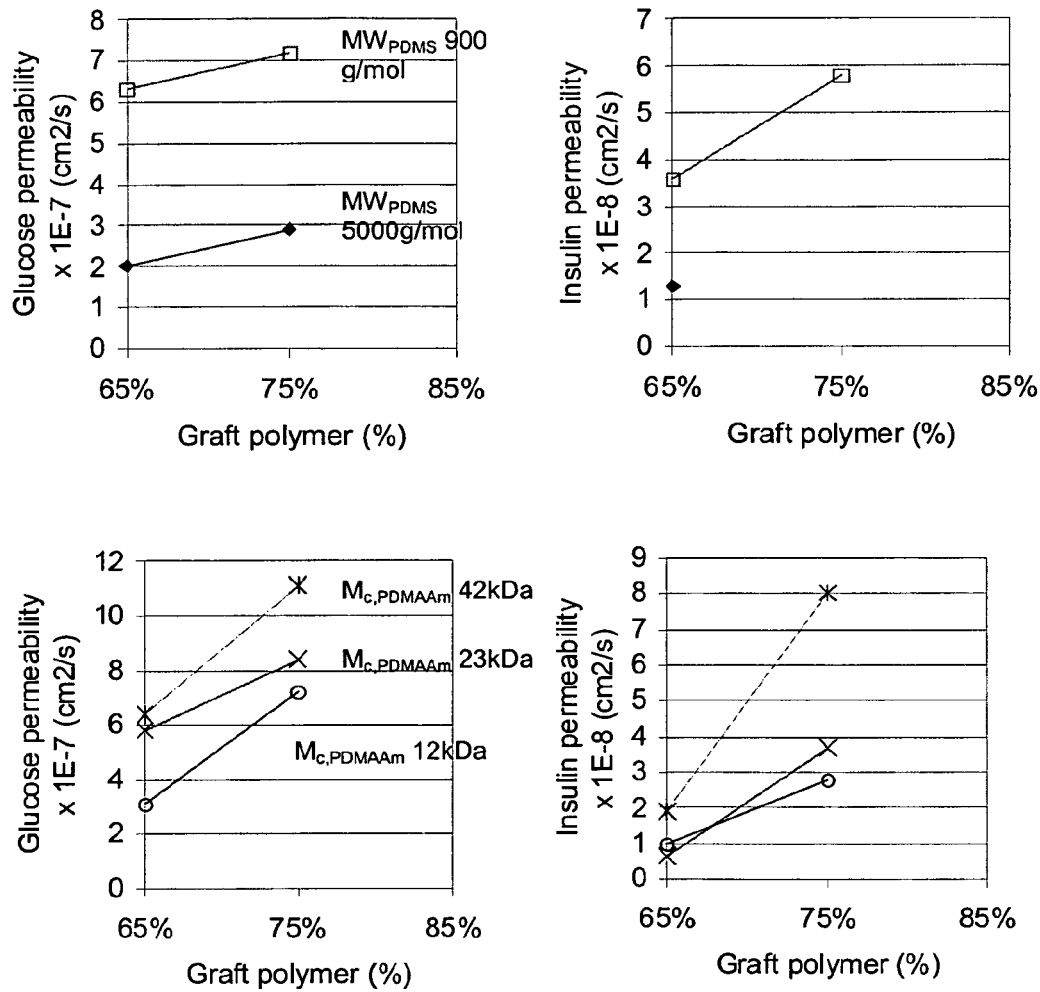
FIG. 14 are graphs illustrating transport properties of blends (♦ PDMAAm$_{66}$-g-PDMS$_{34}$5K; □ PDMAAm$_{93}$-g-PDMS$_7$0.9K; ○ PDMAAm$_{93}$-g-PDMS$_7$0.9K(Mc~12K); X PDMAAm$_{96}$-g-PDMS$_4$0.9K(Mc~23K); * PDMAAm$_{98}$-g-PDMS$_2$0.9K(Mc~42K)).

FIG. 14 shows the effect of blend composition on glucose and insulin permeabilities at two PDMS molecular weights (i.e., $PDMAAm_{66}$-g-$PDMS_{34}5K$ and $PDMAAm_{93}$-g-$PDMS_{7}0.9K$) and three $M_{c,PDMAAm}$s (i.e., $PDMAAm_{93}$-g-$PDMS_{7}0.9K(Mc\sim12K)$, $PDMAAm_{98}$-g-$PDMS_{4}0.9K(Mc\sim23K)$, and $PDMAAm_{98}$-g-$PDMS_{2}0.9K(Mc\sim42K)$). The blend with $PDMAAm_{88}$-g-$PDMS_{34}5K$ (i.e., with the highest PDMS and lowest PDMAAm content) exhibited the lowest equilibrium swelling in water (see Table 4) and showed the lowest glucose and insulin permeabilities. The effect of $M_{c,PDMAAm}$ and the amount of graft in the blend are also as anticipated: glucose and insulin permeabilities increase with increasing $M_{c,PDMAAm}$ and the amount of graft (i.e., PDMAAm) in the blend.

It is of interest to compare the permeabilities of blends obtained with PDMAAm$_{93}$-g-PDMS$_7$0.9K and PDMAAm$_{93}$-g-PDMS$_7$0.9K(Mc~12K) (see the data □ and ○ in FIG. 8). Both blends contain the same amount of PDMS, and the only difference is the $M_{c,PDMAAm}$ (i.e., PDMAAm$_{93}$-g-PDMS$_7$0.9K is prepared at 100% DMAAm conversion, whereas PDMAAm$_{93}$-g-PDMS$_7$0.9K(Mc~12K) is obtained at 35% DMAAm conversion). The copolymer backbone of the PDMAAm$_{93}$-g-PDMS$_7$0.9K(Mc~12K) graft, obtained at a lower (35%) DMAAm conversion, is statistically more uniform than that of PDMAAm$_{93}$-g-PDMS$_7$0.9K, obtained at 100% DMAAm conversion. Thus, the latter must contain some long PDMAAm sequences, and is therefore more permeable to aqueous solutions.

Immunoisolatory membranes in a bioartificial pancreas are designed to protect implanted living tissue from the host's immune response, and, specifically, to bar the transport of immunoproteins (the smallest of which is IgG). The permeability of bovine serum albumin (BSA) through a 25/75 PDMS-PU/PDMAAm$_{93}$-g-PDMS$_7$0.9K blend membrane is investigated and found to have very low (approximately $10^{-12}$ cm$^2$/s) permeability. Because BSA is a much smaller protein than IgG (the diameters of BSA and IgG are approximately 7 nm and approximately 12 nm, respectively), it is submitted that a membrane formed from a TP-APCN in accordance with the present invention will effectively bar the permeation of IgG.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. An amphiphilic network comprising at least one hydrophilic polymer-derived portion, at least one hydrophobic polymer-derived portion and at least one thermoplastic polymer-derived portion, wherein said at least one hydrophilic polymer-derived portion derives from one or more macrodiols with a branched group of poly(2-methyl-2-oxazoline), wherein said at least one hydrophobic polymer-derived portion derives from one or more polydimethylsiloxanes, and wherein said at least one thermoplastic polymer-derived portion is a thermoplastic polyurethane portion containing methylene diphenyl diisocyanate-1,4-butanediol units.

2. The amphiphilic network of claim 1, wherein the amphiphilic network is physically crosslinked.

3. The amphiphilic network of claim 1, wherein the at least one hydrophilic polymer-derived portion of the amphiphilic network has from about 5 to about 5,000 repeating polymer units in the at least one hydrophilic polymer-derived portion.

4. The amphiphilic network of claim 1, wherein the at least one hydrophobic polymer-derived portion of the amphiphilic network has from about 2 to about 5,000 repeating polymer units in the at least one hydrophobic polymer-derived portion.

5. A method for producing a thermoplastic amphiphilic network comprising the steps of:
(A) combining methylene diphenyl diisocyanate (MDI), a polydimethylsiloxane, 1,4-butanediol, and a macrodiol with a branched poly(2-methyl-2-oxazoline) (PMeOx) group; and
(B) reacting the MDI, the polydimethylsiloxane, 1,4-butanediol, and the marcodiol to form a thermoplastic amphiphilic network.

6. The method of claim 5, wherein the thermoplastic amphiphilic network is physically crosslinked.

7. The method of claim 5, wherein the macrodiol has from about 5 to about 5,000 repeating polymer units therein.

8. A method for producing a thermoplastic amphiphilic network comprising the steps of:
(a) combining at least one amphiphilic graft copolymer having one or more hydrophilic portions and one or more hydrophobic portions with at least one copolymer having one or more hydrophobic portions and one or more thermoplastic portions; wherein said at least one hydrophilic portion derives from one or more macrodiols with a branched group of poly(2-methyl-2-oxazoline), wherein said at least one hydrophobic portion derives from one or more polydimethylsiloxanes, and wherein said at least one thermoplastic polymer-derived portion is a thermoplastic polyurethane portion containing methylene diphenyl diisocyanate-1,4-butanediol units; and
(b) reacting the at least one amphiphilic graft copolymer having one or more hydrophilic portions and one or more hydrophobic portions with at least one copolymer having one or more hydrophobic portions and one or more thermoplastic portions to form a thermoplastic amphiphilic network.

9. The method of claim 8, wherein the thermoplastic amphiphilic network is physically crosslinked.

10. The method of claim 8, wherein the one or more hydrophilic portions of the at least one amphiphilic graft copolymer each have from about 5 to about 5,000 repeating polymer units.

11. The method of claim 8, wherein the one or more hydrophobic portions of the at least one amphiphilic graft copolymer each have from about 2 to about 5,000 repeating polymer units.

12. The method of claim 8, wherein the one or more hydrophobic portions of the at least one copolymer each have from about 2 to about 5,000 repeating polymer units.

* * * * *